Jan. 1, 1952  G. A. GENTSCH  2,580,538
PORTABLE APPARATUS FOR OBTAINING LINEAR MEASUREMENTS
Filed Aug. 11, 1950
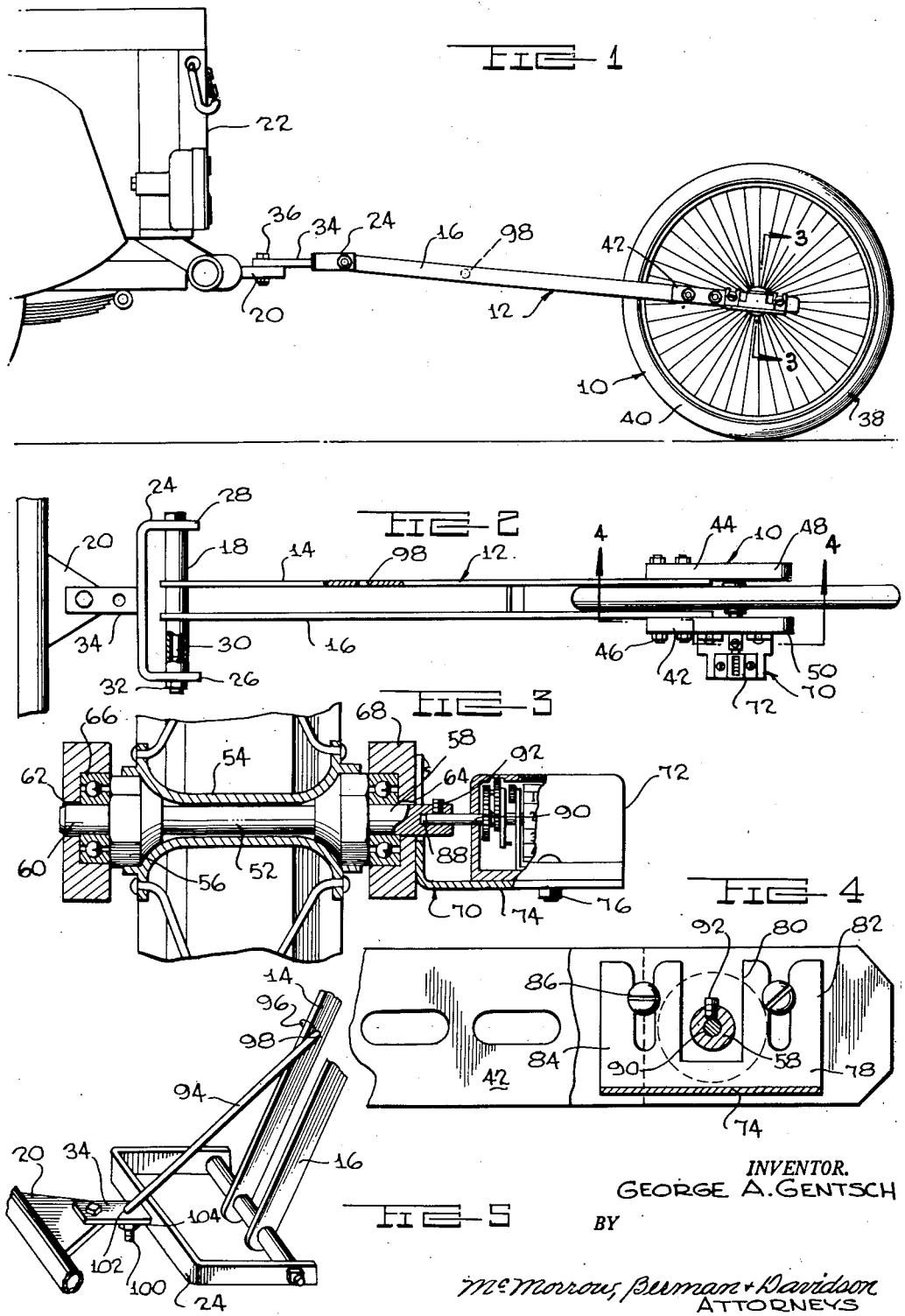
INVENTOR.
GEORGE A. GENTSCH
BY
McMorrow, Berman + Davidson
ATTORNEYS Patented Jan. 1, 1952

2,580,538

UNITED STATES PATENT OFFICE 2,580,538

PORTABLE APPARATUS FOR OBTAINING LINEAR MEASUREMENTS

George A. Gentsch, Oklaunion, Tex.

Application August 11, 1950, Serial No. 178,978

2 Claims. (Cl. 235—95)

This invention appertains to an instrument for measuring land and has for its primary object to provide a portable instrument for conveniently obtaining linear measurements, the instrument being manually operable or attachable to a power vehicle as a trailer unit.

A further object of this invention resides in the provision of a portable frame carrying a counter actuated by the ground-engaging wheel of the frame, the frame being either manually propelled by a user from a standing or walking position or being coupled to a power vehicle.

These and ancillary objects and structural features of merit are attained by this invention, the preferred embodiment of which is set forth in the following description and illustrated in the accompanying drawing, wherein:

Figure 1 is a side elevational view of the measuring instrument forming the subject matter of the instant invention, the same being illustrated as coupled to a vehicle;

Figure 2 is a top plan view of the instrument;

Figure 3 is a transverse sectional view taken on line 3—3 of Figure 1 and illustrating the means for operatively attaching the counter to the ground-engaging wheel;

Figure 4 is a fragmentary sectional view taken on line 4—4 of Figure 2; and

Figure 5 is a detail perspective view, illustrating the means provided for locking the instrument in a raised or inoperative position.

Referring now more particularly to the accompanying drawing, the measuring instrument 10 includes a frame 12, formed from a pair of braced parallel longitudinal bars 14 and 16, to the forward ends of which a sleeve 18 is transversely mounted.

The sleeve 18 is coupled to the hitch bar 20 of a power vehicle 22 by means of a U-shaped bracket 24 having apertured legs 26 and 28. The legs engage the opposing ends of the sleeve, with the apertures in the legs aligned with the sleeve to receive a bolt 30. The bolt 30 is inserted through the legs and sleeve and secured by a nut 32. An apertured horizontal plate 34 projects forwardly from the bight portion of the bracket and is swivelly mounted on the hitch plate 20 by fastening means 36.

A ground-engaging wheel 38 having a resilient tire 40, so that the frame may be easily and noiselessly moved over a floor or land surface, is rotatably journalled between a pair of plates 42 and 44. The plates are fastened to the rear ends of the frame bars 14 and 16 by fasteners 46 and project rearwardly therefrom, the projecting rearward ends 48 and 50 of the plates being disposed in parallelism and rotatably supporting the axle 52 of the wheel.

The axle 52 is mounted in the hub 54 of the wheel by lock nuts 56, and the opposing ends 58 and 60 thereof project outwardly from the hub. The rearward ends 48 and 50 of the plates are provided with transverse apertures 62 and 64, through which the ends of the axle project, the plates being counter-bored to house the bearing assemblies 66 and 68 on which the axle ends are journalled.

A bracket 70 is adjustably mounted on the end 50 of plate 42 and provides a support for a standard counter 72. The bracket 70 includes a horizontally disposed base portion 74 on which the counter is seated. The counter is securely attached to the base portion by a fastener 76. The bracket also includes a vertical portion 78, formed with a centrally disposed vertical opening 80 to define a pair of opposing slotted legs 82 and 84, through which fasteners 86 are inserted. The fasteners are secured in the plate 42 and by means of the vertical slots formed in the legs 82 and 84 of the vertical portion of the bracket, the bracket can be adjusted vertically with respect to the supporting plate.

The end 58 of the axle 52 is formed with an axially disposed socket 88 within which the outer end of the actuating shaft 90 of the counter is housed, the shaft 90 being securely fastened to the axle by means of a radially disposed set screw 92.

In use, the instrument is coupled to the hitch bar 20 of a vehicle by means of the U-shaped bracket 24 and is moved as a trailer unit behind the vehicle. As the ground-engaging wheel 38, which supports the frame, is rotated, responsive to the movement of the vehicle, the axle 52 rotates the counter actuating shaft 90. Thus, whenever the wheel 38 completes a complete revolution, the counter 72 will be actuated to record the complete revolution of the wheel. Obviously, since the circumference of the wheel is known in a given unit of linear measurement, the measurements of a plane surface may be found by multiplying the total revolutions of the wheel, as indicated by the counter, by the circumference.

When the instrument is not in use, it can be secured in a raised position on the hitch bar 20, so that the vehicle 22 can be employed for other uses without uncoupling the instrument from the hitch bar. As seen in Figure 5, means is provided for retaining the frame in a raised position and includes a rod 94 having a laterally offset end 96 engageable in a transverse opening 98 formed in the bar 14 adjacent to the forward end thereof. The opposite end 100 of the rod 94 is offset downwardly from the longitudinal axis of the rod and is externally threaded. The end 100 is inserted through a vertical opening 102 in the plate 34 and held therein by a locking nut 104. The frame can be raised to the vertical position by means of the sleeve 18, which is rotatable about the bolt 30, and will be held in such inoperative position by the rod 94 having its opposite ends attached to the frame and to the plate 34.

If desired, the frame can be manually propelled by a user in a walking position, either pushing or pulling the instrument. The sleeve 18 will function as a handlebar for this purpose.

Having thus described the invention, what is claimed is:

1. An apparatus for obtaining land measurements comprising a pair of longitudinally extending transversely spaced parallel bars, a sleeve transversely disposed through the forward ends of the bars and forming a handlebar, supporting plates secured to the rearward ends of the bars and projecting rearwardly in parallelism therefrom, a wheel having an axle rotatably disposed between the plates, means for rotatably journalling the axle of the wheel in the plates, one end of the axle projecting outwardly from one of the plates, a counter, an angle bracket having a horizontal flange on which the counter is mounted, said bracket having a vertical flange adjustably mounted on one of the plates and having an opening for receiving the projecting end of the axle, said axle having an axial socket formed in the projecting end and said counter having an actuating shaft axially aligned with the axle and releasably socketed in the socket and means for coupling the frame to a power vehicle having a hitch bar and including a U shaped bracket having apertured legs engageable on the opposing ends of the sleeve, locking means disposed through the legs and sleeve, and a hitch plate projecting forwardly from the bight portion of the bracket and engageable on the hitch bar.

2. An apparatus for obtaining land measurements comprising a pair of longitudinally extending transversely spaced parallel bars, a sleeve transversely disposed and rotatably journaled through the forward ends of the bars and forming a handlebar, supporting plates secured to the rearward ends of the bars and projecting rearwardly in parallelism therefrom, a wheel having an axle rotatably disposed between the plates, means for rotatably journalling the axle of the wheel in the plates, one end of the axle projecting outwardly from one of the plates, a counter, a bracket supporting the counter adjustably mounted on one of the plates and having an opening for receiving the projecting end of the axle, means for operatively connecting the axle to the counter and means for coupling the frame to a power vehicle having a hitch bar and including a U shaped bracket having apertured legs engageable on the opposite ends of the sleeve, locking means disposed through the legs and sleeve, a hitch plate projecting forwardly from the bight portion of the bracket and engageable on the hitch bar, and means for locking said bars and wheel in a raised position including an upstanding locking rod connected at one end to the hitch plate and having an offset opposing end, one of said bars having an opening for receiving said offset end of the rod.

GEORGE A. GENTSCH.

REFERENCES CITED

The following references are of record in the file of this patent:

UNITED STATES PATENTS

| Number | Name | Date |
| --- | --- | --- |
| 281,468 | Dewell | July 17, 1883 |
| 344,536 | McCaleb | June 29, 1886 |
| 382,438 | Robards | May 8, 1888 |
| 563,410 | Ravenel | July 7, 1896 |
| 673,300 | Stadel et al. | Apr. 30, 1901 |
| 745,726 | Hathaway | Dec. 1, 1903 |
| 1,629,758 | Wilson | May 24, 1927 |
| 2,354,708 | Segal | Aug. 1, 1944 |